(12) United States Patent
Sharp et al.

(10) Patent No.: US 9,286,087 B2
(45) Date of Patent: **\*Mar. 15, 2016**

(54) STORAGE OPTIMIZATION SELECTION WITHIN A VIRTUALIZATION ENVIRONMENT

(71) Applicant: Citrix Systems, Inc., Fort Lauderdale, FL (US)

(72) Inventors: Richard Sharp, Cambridge (GB); David Scott, Cambridge (GB)

(73) Assignee: Citrix Systems, Inc., Fort Lauderdale, FL (US)

( \* ) Notice: Subject to any disclaimer, the term of this patent is extended or adjusted under 35 U.S.C. 154(b) by 188 days.

This patent is subject to a terminal disclaimer.

(21) Appl. No.: 13/799,776

(22) Filed: Mar. 13, 2013

(65) Prior Publication Data

US 2013/0198748 A1   Aug. 1, 2013

Related U.S. Application Data

(63) Continuation of application No. 12/750,089, filed on Mar. 30, 2010, now Pat. No. 8,413,142.

(51) Int. Cl.
*G06F 9/455* (2006.01)
*G06F 3/06* (2006.01)
*G06F 21/62* (2013.01)

(52) U.S. Cl.
CPC ............. *G06F 9/455* (2013.01); *G06F 3/0605* (2013.01); *G06F 3/0632* (2013.01); *G06F 3/0664* (2013.01); *G06F 3/0689* (2013.01); *G06F 21/6218* (2013.01)

(58) Field of Classification Search
None
See application file for complete search history.

(56) References Cited

U.S. PATENT DOCUMENTS

| 6,490,651 | B1 | 12/2002 | Shats et al. |
| 7,356,679 | B1 | 4/2008 | Le et al. |
| 7,606,868 | B1 * | 10/2009 | Le et al. ................. 709/211 |

(Continued)

FOREIGN PATENT DOCUMENTS

| WO | WO-03/088002 | 10/2003 |
| WO | WO-2008/002419 | 1/2008 |

OTHER PUBLICATIONS

Extended European Search Report on 11159381.0 dated Aug. 30, 2012.

(Continued)

*Primary Examiner* — Adam Lee
(74) *Attorney, Agent, or Firm* — Foley & Lardner LLP; John D. Lanza

(57) ABSTRACT

Storage optimization selection for virtual disks of a virtualization environment, where the storage optimization can be selected based in part on the disk type of a virtual disk included in a virtual machine. The disk type of the virtual disk can be discovered by the virtualization environment which queries a database within the virtualization environment for metadata associated with the virtual disk. The metadata can be created when a virtual desktop infrastructure creates the virtual disk, and a virtual machine template that includes the at least one virtual disk. The virtual disk can be modified to either include or be associated with the metadata that describes a disk type of the virtual disk. Upon executing the virtual machine that includes the modified virtual disk, a storage subsystem of the virtualization environment can obtain the metadata of the virtual disk to discover the disk type of the virtual disk.

17 Claims, 8 Drawing Sheets

(56) References Cited

U.S. PATENT DOCUMENTS

| | | |
|---|---|---|
| 7,774,391 B1 | 8/2010 | Le et al. |
| 8,099,391 B1 | 1/2012 | Monckton |
| 8,209,680 B1 * | 6/2012 | Le et al. ............ 717/174 |
| 8,219,653 B1 | 7/2012 | Keagy et al. |
| 8,321,857 B1 * | 11/2012 | Prosso et al. ............ 717/172 |
| 8,332,570 B1 * | 12/2012 | Cook et al. ............ 711/6 |
| 2006/0069864 A1 | 3/2006 | Dalal et al. |
| 2006/0218544 A1 | 9/2006 | Chakraborty et al. |
| 2007/0294476 A1 | 12/2007 | Corn et al. |
| 2007/0294676 A1 | 12/2007 | Mellor et al. |
| 2008/0163171 A1 | 7/2008 | Chess et al. |
| 2009/0300023 A1 * | 12/2009 | Vaghani ............ 707/10 |
| 2009/0300302 A1 | 12/2009 | Vaghani |
| 2010/0049750 A1 * | 2/2010 | Srivastava et al. ............ 707/202 |
| 2010/0070978 A1 * | 3/2010 | Chawla et al. ............ 718/105 |
| 2010/0162039 A1 | 6/2010 | Goroff et al. |
| 2010/0169881 A1 * | 7/2010 | Silvera et al. ............ 718/1 |
| 2011/0191522 A1 * | 8/2011 | Condict et al. ............ 711/103 |
| 2011/0191834 A1 * | 8/2011 | Singh et al. ............ 726/6 |

OTHER PUBLICATIONS

Notice of Allowance on U.S. Appl. No. 12/750,089 dated Dec. 6, 2012.
Office Action on U.S. Appl. No. 12/750,089 dated Aug. 14, 2012.
VMWARE: "vSphere Basic System Administration, vCenter Server 4.0, ESX 4.0, ESXi 4.0", Jun. 16, 2009 vol. EN-000105-01 Jun. 16, 2009, pp. 1-374, XP007918070, Retrieved from the Internet: URL:http://replay.waybackmachine.org/20091011004437/http://www.vmware.com/pdf/vsphere4/r40/vsp_40_admin_guide.pdf.
Chinese Office Action on 201110079379.6 dated Sep. 29, 2013.
European Examination Report on 11159381.0 dated Jan. 13, 2015.
European Examination Report on 11159381.0 dated Oct. 2, 2015.

\* cited by examiner

STORAGE OPTIMIZATION SELECTION WITHIN A VIRTUALIZATION ENVIRONMENT

This U.S. Patent Application is a continuation of U.S. patent application Ser. No. 12/750,089, filed on Mar. 30, 2010, entitled, "Storage Optimization Selection Within A Virtualization Environment", which is now allowed. The disclosure of this prior application is considered part of the disclosure of this application and is incorporated herein by reference in its entirety.

FIELD OF THE DISCLOSURE

This application generally relates to virtual machine configuration. In particular, this application relates to configuring a virtual disk within a virtual machine.

BACKGROUND OF THE DISCLOSURE

Virtual machines can typically access virtual disks that are configured using one or more storage optimizations. Configuring a virtual disk to have a particular storage optimization often requires knowledge of the disk type of the virtual disk. When a virtual machine is created, the type of virtual disk to-be-included may not be known. In these instances, the virtual machine creator may not be able to choose an effective storage optimization because the virtual machine creator may not know the disk type of the virtual disk.

In virtual desktop infrastructure environments, virtual disks can be any disk type. For example, a virtual disk can store an operating system image from which a virtual machine boots; or the virtual disk can include a non-persistent write-back cache that stores data that is invalidated and destroyed when a virtual machine is rebooted. In some instances, the virtual disk can be an image customization disk created to pass through data and binaries that are used to customize a virtual machine after that virtual machine boots. Different disk types often have different properties, therefore these different disk types often map to different disk storage optimizations.

Virtualization platforms often cannot identify the type of disk included in a particular virtual machine. Rather, the system that creates the virtual machine is often the only system that knows the disk type of the virtual disk in a particular virtual machine. Selecting a storage-specific optimization can therefore be difficult for the virtualization platform because the platform does not know what type of virtual disk is included in a particular virtual machine.

SUMMARY OF THE DISCLOSURE

In the broadest sense, this disclosure describes methods and systems for informing a virtualization environment of the disk type of a virtual disk included in a virtual machine. In many instances, the virtualization environment does not know the disk type of a virtual disk within a virtual machine. Thus, the virtualization environment often cannot adequately select a storage-specific optimization for the virtual machine. By informing the virtualization environment of the disk type of a virtual disk in a virtual machine, that virtualization environment can select an appropriate storage-specific optimization for that virtual machine.

In one aspect, described herein is a method for selecting storage optimizations for a disk within a virtualization environment using metadata indicating a disk type of the disk. A virtual desktop infrastructure executing on a computing machine creates a virtual machine template comprising at least one virtual disk. The virtual desktop infrastructure then modifies, responsive to creating the virtual machine template, the at least one of the virtual disk to be associated with or comprise metadata describing a disk type of the at least one virtual disk. A virtualization environment executes a virtual machine that is created using the virtual machine template created by the virtual desktop infrastructure. A storage subsystem of the virtualization environment, obtains metadata of the at least one virtual disk, and selects a storage optimization for the at least one virtual disk based in part on the disk type described in the metadata.

In some embodiments, the method further includes copying the virtual machine template to create a second virtual machine template comprising the at least one virtual disk comprising the metadata describing the disk type.

In other embodiments, the method further includes attaching a storage optimized according to the selected storage optimization.

In still other embodiments, the storage subsystem selects a storage optimization based in part on the disk type and a specific disk storage type. Modifying the virtual disk, in some embodiments, can further include modifying the virtual disk to be associated with or comprise metadata to describe an operating system image disk type. In these embodiments, the storage subsystem can select a storage optimization comprising creating a cache of the virtual disk.

In one embodiment, the virtual disk can be modified to be associated with or comprise metadata describing a non-persistent cache disk type. The storage subsystem, in this embodiment, can select a storage optimization that comprises any one of re-order writes and early write acknowledgements.

In another embodiment, the virtual disk can be modified to be associated with or comprise metadata describing an image customization disk type. The storage subsystem, in this embodiment, can select a storage optimization that comprises security measures.

In another aspect, described herein is a system for selecting storage optimizations for a disk within a virtualization environment using metadata indicating a disk type of the disk. The system includes a virtual desktop infrastructure that executes on a computing machine to create a virtual machine template comprising at least one virtual disk. The virtual desktop infrastructure then modifies, in response to creating the virtual machine template, the at least one virtual disk to be associated with or comprise metadata describing a disk type of the at least one virtual disk. The system further includes a virtual machine executing within a virtualization environment, where the virtual machine created using the virtual machine template created by the virtual desktop infrastructure. Also included is a storage subsystem that executes within the virtualization environment to obtain the metadata of the at least one virtual disk. Upon obtaining the metadata, the storage subsystem selects a storage optimization for the at least one virtual disk based in part on the disk type described in the metadata.

BRIEF DESCRIPTION OF THE DRAWINGS

The following figures depict certain illustrative embodiments of the methods and systems described herein, in which like reference numerals refer to like elements. These depicted embodiments are to be understood as illustrative of the disclosed methods and systems and not as limiting in any way.

DETAILED DESCRIPTION OF THE DRAWINGS

Figure 1A:
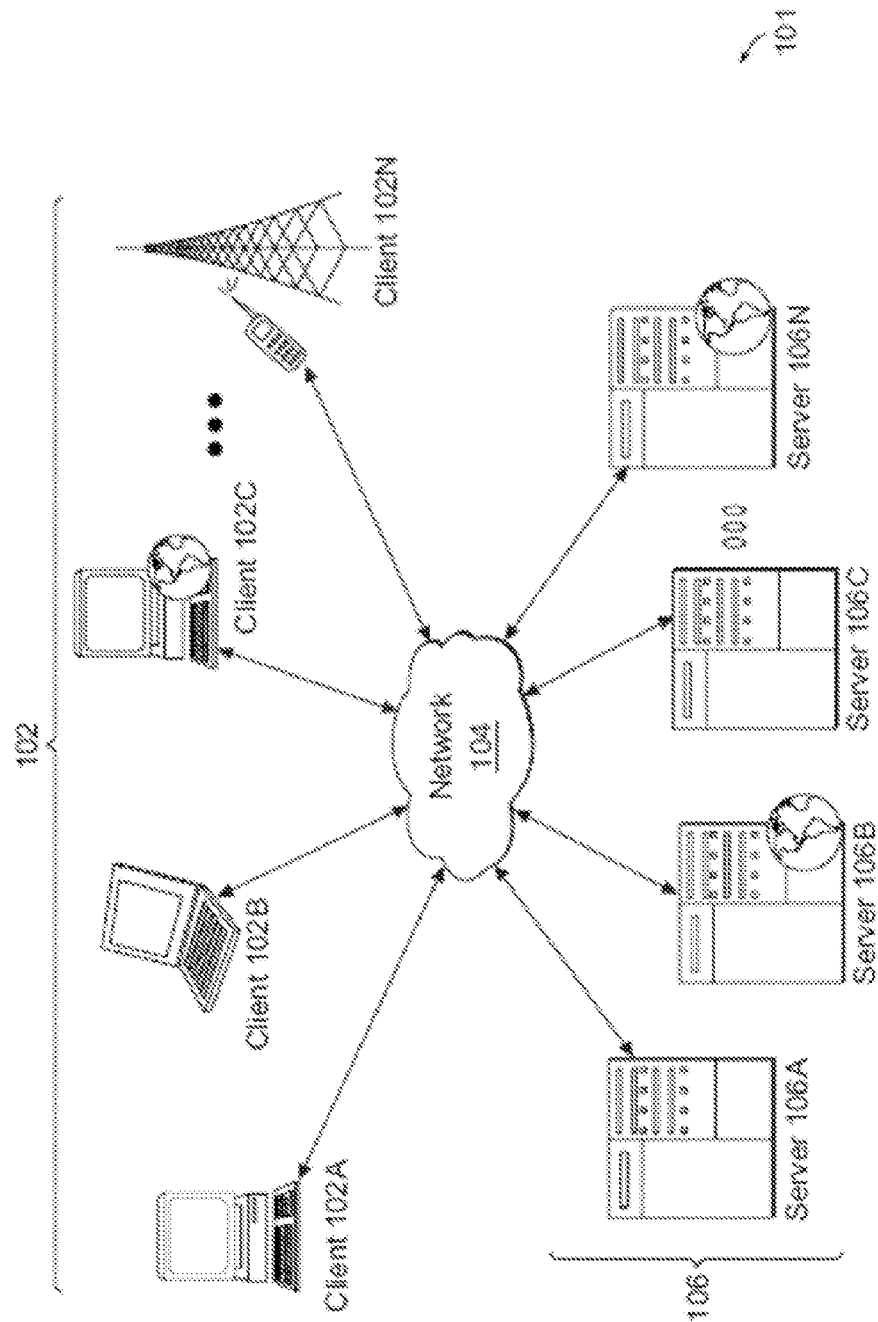
FIG. 1A depicts embodiments of network environments that provide remote access to computing devices that can execute application programs.

FIG. 1A illustrates one embodiment of a computing environment 101 that includes one or more client machines 102A-102N (generally referred to herein as "client machine(s) 102") in communication with one or more servers 106A-106N (generally referred to herein as "server(s) 106"). Installed in between the client machine(s) 102 and server(s) 106 is a network.

In one embodiment, the computing environment 101 can include an appliance installed between the server(s) 106 and client machine(s) 102. This appliance can mange client/server connections, and in some cases can load balance client connections amongst a plurality of backend servers.

The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 102 can be a virtual machine 102C. The virtual machine 102C can be any virtual machine, while in some embodiments the virtual machine 102C can be any virtual machine managed by a hypervisor developed by XenSolutions, Citrix Systems, IBM, VMware, or any other hypervisor. In other embodiments, the virtual machine 102C can be managed by any hypervisor, while in still other embodiments, the virtual machine 102C can be managed by a hypervisor executing on a server 106 or a hypervisor executing on a client 102.

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The server 106, in some embodiments, executes a remote presentation client or other client or program that uses a thin-client or remote-display protocol to capture display output generated by an application executing on a server 106 and transmits the application display output to a remote client 102. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment 101 can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices.

Figure 1B:
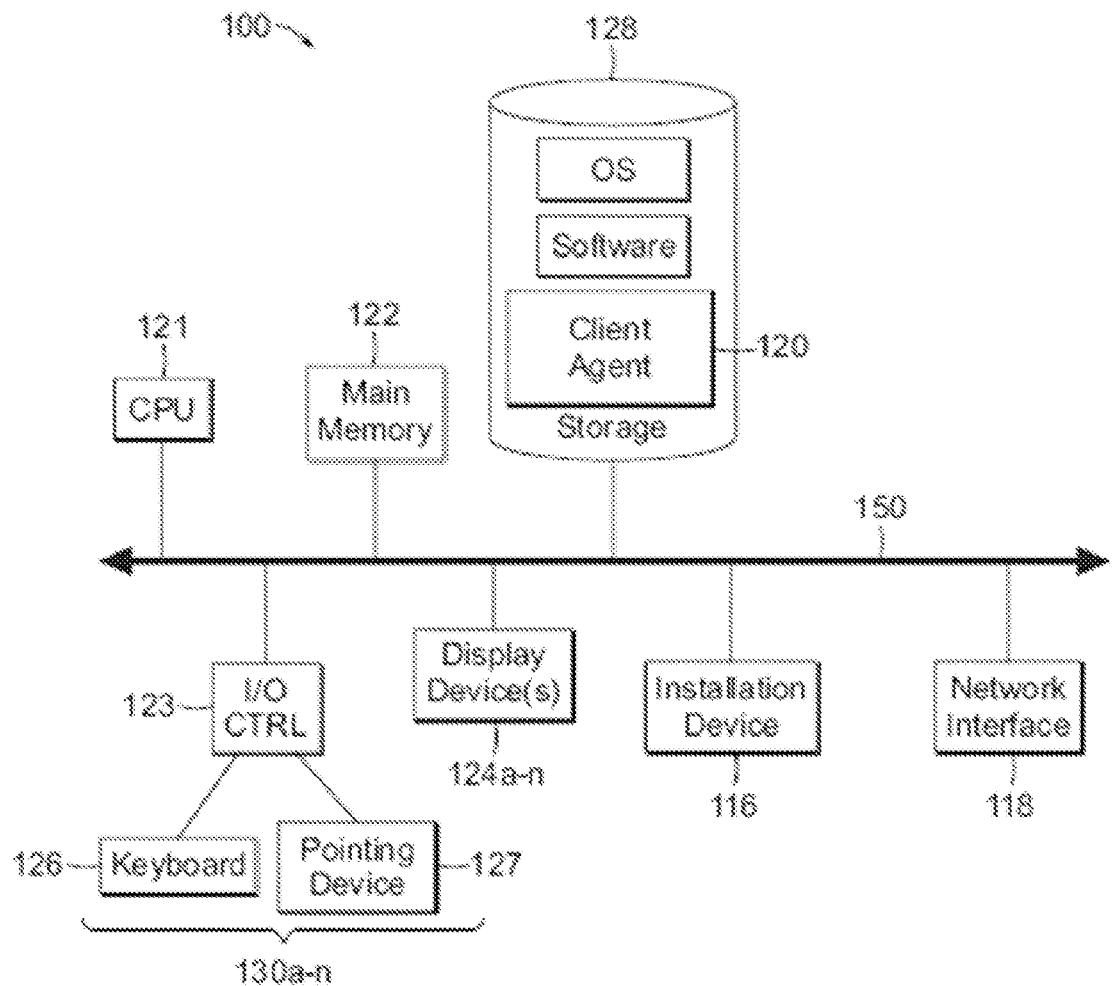
FIG. 1B and FIG. 1C are block diagrams that depict embodiments of computing devices.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
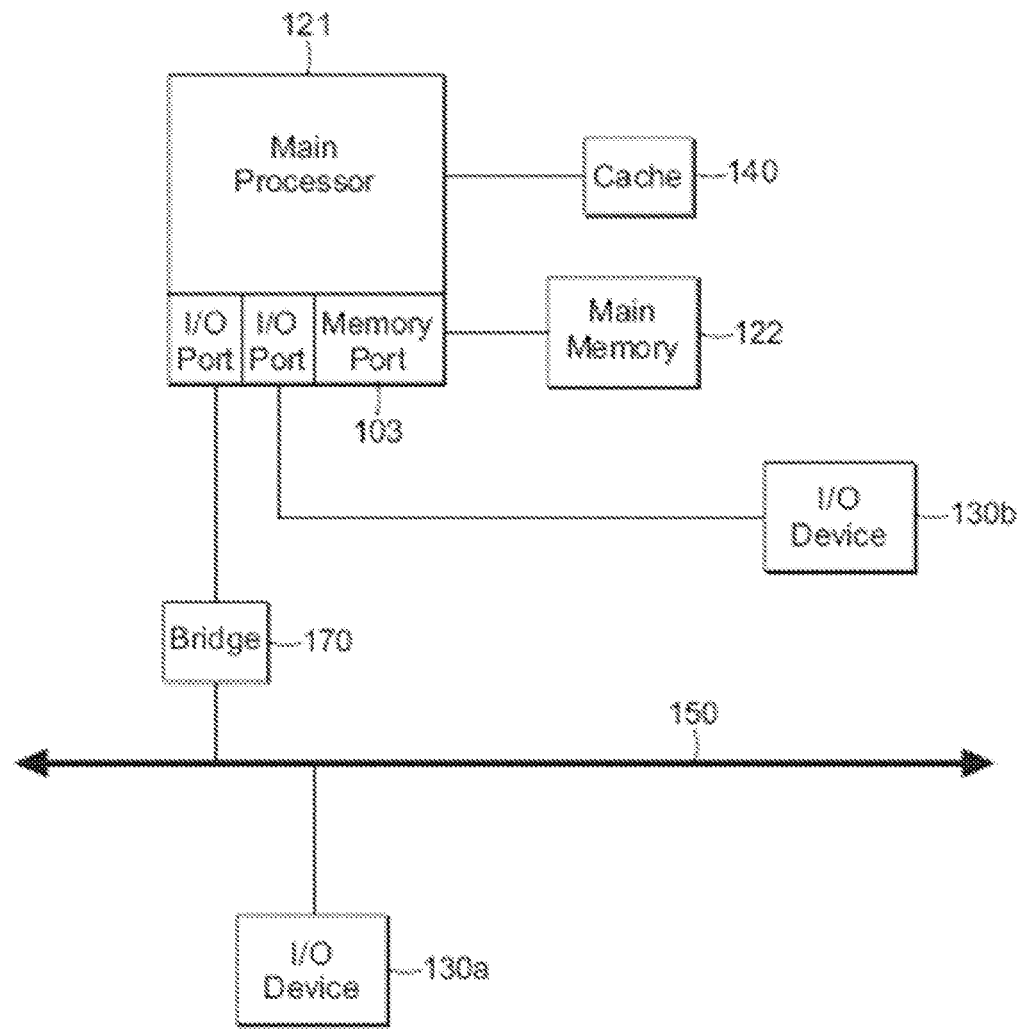

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121, may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a MicroChannel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, TPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super WPM bus; a SerialPlus bus; a SCI/LAMP bus; a FibreChannel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124A-124N. The computing device 100 may in some embodiments be configured to use one or multiple display devices 124A-124N, these configurations include: having multiple connectors to interface to multiple display devices 124A-124N; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments, the computing machine 100 can execute any operating system, while in other embodiments the computing machine 100 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARAL-LELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

Figure 2A:
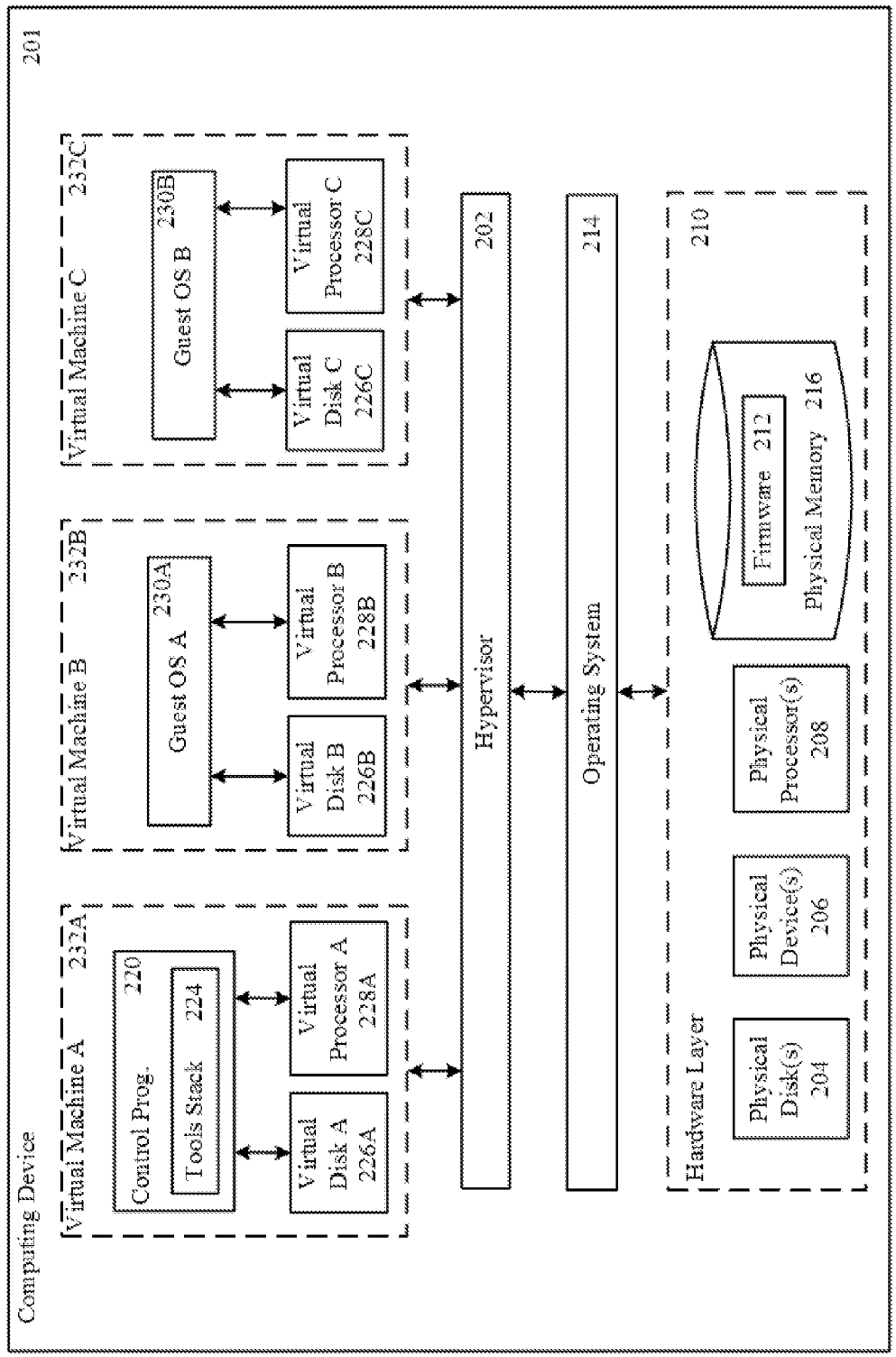
FIG. 2A and FIG. 2B are block diagrams that depict embodiments of a virtualization environment.

Illustrated in FIG. 2A is one embodiment of a virtualization environment. Included on a computing device 201 is a hardware layer that can include one or more physical disks 204, one or more physical devices 206, one or more physical processors 208 and a physical memory 216. In some embodiments, firmware 212 can be stored within a memory element in the physical memory 216 and can be executed by one or more of the physical processors 208. The computing device 201 can further include an operating system 214 that can be stored in a memory element in the physical memory 216 and executed by one or more of the physical processors 208. Still further, a hypervisor 202 can be stored in a memory element in the physical memory 216 and can be executed by one or more of the physical processors 208. Executing on one or more of the physical processors 208 can be one or more virtual machines 232A-C (generally 232). Each virtual machine 232 can have a virtual disk 226A-C and a virtual processor 228A-C. In some embodiments, a first virtual machine 232A can execute, on a virtual processor 228A, a control program 220 that includes a tools stack 224. In other embodiments, one or more virtual machines 232B-C can executed, on a virtual processor 228B-C, a guest operating system 230A-B.

Further referring to FIG. 2A, and in more detail, in one embodiment the virtualization environment described includes a Type 2 hypervisor 202, or a hypervisor that executes within an operating system 214 executing on the computing device 201. A Type 2 hypervisor, in some embodiments, executes within an operating system 214 environment and virtual machines execute at a level above the hypervisor.

In many embodiments, the Type 2 hypervisor executes within the context of a user's operating system such that the Type 2 hypervisor interacts with the user's operating system.

In some embodiments, the virtualization environment includes a computing device 201. The computing device 201 can be any computing device, and in some embodiments the computing device 201 can be any computer, device or computing machine described herein. While FIG. 2A illustrates a single computing device 201, in some embodiments the modules, programs, virtual machines, and commands stored and executed by the computing device 201 can be executed by more than one computing device 201. In still other embodiments, the computing device 201 can be a server farm.

In one embodiment, the computing device 201 can include a hardware layer 210 that includes one or more pieces of hardware that communicates with the computing machine 201. In some embodiments, the hardware layer 210 can include any hardware included in the computing device 201. In other embodiments, the hardware layer 210 can include one or more physical disks 204, one or more physical devices 206, one or more physical processors 208 and memory 216.

The hardware layer 210, in some embodiments, can include one or more physical disks 204. A physical disk 204 can be any hard disk, while in some embodiments a physical disk 204 can be any hard disk described herein. In some embodiments, the hardware layer 210 can include one physical disk 204. In other embodiments, the hardware layer 210 can include more than one physical disk 204. The computing device 201, in some embodiments, can communicate with an external hard disk that is included in the hardware layer 210 as a physical disk 204.

In other embodiments, the hardware layer 210 can include a processor 208. The processor 208, in some embodiments, can be any processor, while in other embodiments the processor 208 can be any processor described herein. The processor 208 can include one or more processing cores. In other embodiments the computing device 201 can include one or more processors 208. In some embodiments, the computing device 201 can include one or more different processors, e.g. a processing unit, a graphics processing unit, or a physics engine.

Physical devices 206, in some embodiments, can be any device included in the computing device 201. In some embodiments, physical devices 206 can be any combination of devices included in the computing device 201 and external devices that communicate with the computing device 201. The computing device 201, in some embodiments, can include one or more physical devices 206. A physical device 206 can be any of the following: a network interface card; a video card; a keyboard; a mouse; an input device; a monitor; a display device; speakers; an optical drive; a storage device; a universal serial bus connection; any device connected to the computing device 201; any device communicating with the computing device 201; a printer; a scanner; or any other device or device described herein.

The hardware layer 210 can further include physical memory 216 that can include any type of memory. In some embodiments, the physical memory 216 can include any memory type described herein. The physical memory 216 can store data, and in some embodiments can store one or more programs, or set of executable instructions. FIG. 2A illustrates one embodiment where firmware 212 is stored within the physical memory 216 of the computing device 201. Programs or executable instructions stored in the physical memory 216 can be executed by the one or more processors 208 of the computing device 201.

Firmware 212, in some embodiments, can be any combination of executable instructions and hardware that controls hardware communicating with or included within the computing device 201. In some embodiments, the firmware 212 can control one or more pieces of hardware within the hardware layer 210. Firmware 212, in many embodiments, can be executed by one or more processors 208 within the computing device 201. In some embodiments, the firmware 212 can be boot firmware such as the basic input/output system (BIOS.) Additional firmware 212 executing on the computing device 201 can interface with the BIOS.

In one embodiment, the computing device 201 can include an operating system 214 executed by one or more physical processors 208. In some embodiments, the operating system 214 is a user operating system that can directly access the hardware devices in the hardware layer 210. The operating system 214 can be any operating system and in some embodiments, the operating system 214 can be any operating system described herein. FIG. 2A illustrates one embodiment where the hypervisor 202 executes within the context of the operating system 214 executing on the computing device 201. In this embodiment, the operating system 214 can be referred to as a host operating system 214, while the other operating systems can be referred to as guest operating systems. Guest operating systems can include the guest operating systems 230A-B executing on the virtual machines 232, and/or the control program 220.

In some embodiments, the computing device 201 can include a hypervisor 202. A hypervisor 202, in some embodiments, can be a program that executed by processors 208 on the computing device 201 to manage any number of virtual machines. The hypervisor 202 can be referred to as a virtual machine monitor, or platform virtualization software. In some embodiments, a hypervisor 202 can be any combination of executable instructions and hardware that monitors virtual machines executing on a computing machine. While FIG. 2A illustrates a virtualization environment that includes a Type 2 hypervisor 202, the computing device 201 can execute any other type of hypervisor. For example, the computing device 201 can execute a virtualization environment that includes a Type 1 hypervisor 202. In some embodiments, the computing device 201 can execute one or more hypervisors 202. These one or more hypervisors 202 can be the same type of hypervisor, or in other embodiments can be different hypervisor types.

The hypervisor 202, in some embodiments, can provide virtual resources to operating systems 230 or control programs 220 executing on virtual machines 232 in any manner that simulates the operating systems 230 or control programs 220 having direct access to system resources. System resources can include: physical devices; physical disks; physical processors; physical memory 216 and any other component included in the computing device 201 hardware layer 210. In these embodiments, the hypervisor 202 may be used to emulate virtual hardware, partition physical hardware, virtualize physical hardware, or execute virtual machines that provide access to computing environments. In still other embodiments, the hypervisor 202 controls processor scheduling and memory partitioning for a virtual machine 232 executing on the computing device 201. Hypervisor 202 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 201 executes a hypervisor 202 that creates a virtual machine platform on which guest operating systems may execute. In these embodiments, the computing device 201 can be referred to as a host server. An example of such a computing device is the XEN SERVER provided by Citrix Systems, Inc., of Fort Lauderdale, Fla.

In one embodiment, the hypervisor 202 can create a virtual machine 232A-B (generally 232) in which an operating system 230 executes. In one of these embodiments, for example, the hypervisor 202 loads a virtual machine image to create a virtual machine 232. In another of these embodiments, the hypervisor 202 executes an operating system 230 within the virtual machine 232. In still another of these embodiments, the virtual machine 232 executes an operating system 230.

In one embodiment, the hypervisor 202 controls the execution of at least one virtual machine 232. In another embodiment, the hypervisor 202 presents at least one virtual machine 232 with an abstraction of at least one hardware resource provided by the computing device 201. The abstraction can further be referred to as a virtualization or virtual view of the hardware, memory processor and other system resources available on the computing device 201. Hardware or hardware resources, in some embodiments, can be any hardware resource available within the hardware layer 210. In other embodiments, the hypervisor 202 controls the manner in which virtual machines 232 access the physical processors 208 available in the computing device 201. Controlling access to the physical processors 208 can include determining whether a virtual machine 232 should have access to a processor 208, and how physical processor capabilities are presented to the virtual machine 232.

In some embodiments, the computing device 201 can host or execute one or more virtual machines 232. A virtual machine 232 can be called a domain, a guest and/or a DOMAIN U. A virtual machine 232 is a set of executable instructions that, when executed by a processor 208, imitate the operation of a physical computer such that the virtual machine 232 can execute programs and processes much like a physical computing device. While FIG. 2A illustrates an embodiment where a computing device 201 hosts three virtual machines 232, in other embodiments the computing device 201 can host any number of virtual machines 232. The hypervisor 202, in some embodiments, provides each virtual machine 232 with a unique virtual view of the physical hardware, memory, processor and other system resources available to that virtual machine 232. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. The hypervisor 202, in other embodiments, provides each virtual machine 232 with a substantially similar virtual view of the physical hardware, memory, processor and other system resources available to the virtual machines 232.

Each virtual machine 232 can include a virtual disk 226A-C (generally 226) and a virtual processor 228A-C (generally 228.) The virtual disk 226, in some embodiments, is a virtualized view of one or more physical disks 204 of the computing device 201, or a portion of one or more physical disks 204 of the computing device 201. The virtualized view of the physical disks 204 can be generated, provided and managed by the hypervisor 202. In some embodiments, the hypervisor 202 provides each virtual machine 232 with a unique view of the physical disks 204. Thus, in these embodiments, the virtual disk 226 included in each virtual machine 232 can be unique when compared with the other virtual disks 226.

A virtual processor 228 can be a virtualized view of one or more physical processors 208 of the computing device 201. In some embodiments, the virtualized view of the physical processors 208 can be generated, provided and managed by the hypervisor 202. In some embodiments, the virtual processor 228 has substantially all of the same characteristics of at least one physical processor 208. In other embodiments, the virtual processor 208 provides a modified view of the physical processors 208 such that at least some of the characteristics of the virtual processor 228 are different than the characteristics of the corresponding physical processor 208.

A control program 220 may execute at least one application for managing and configuring the guest operating systems executing on the virtual machines 232 and in some embodiments the computing device 201. In some embodiments, the control program 220 can be called a control operating system, a control domain, domain 0 or dom 0. The control program 220, in some embodiments, can be DOMAIN o or DOM0 of the XEN hypervisor. The control program 220 can execute an administrative application or program that can further display a user interface which administrators can use to access the functionality of each virtual machine 232 and/or to manage the virtual machines 232. In some embodiments, the user interface generated by the administrative program can be used to terminate the execution of virtual machines 232, allocate resources to virtual machines 232, assign permissions to virtual machines 232, or manage security credentials associated with virtual machines 232. The control program 220, in some embodiments, can start new virtual machines 232 or terminate execution of executing virtual machines 232. In other embodiments, the control program 220 can directly access hardware and/or resources within the hardware layer 210. In still another embodiment, the control program 220 can interface with programs and applications executing on the computing device 210 and outside of the context of a virtual machine 232. Similarly, the control program 220 can interface with programs and applications executing within the context of a virtual machine 232.

In one embodiment, the hypervisor 202 can execute the control program 220 within a virtual machine 232. The hypervisor 202 can create and start the virtual machine 232. In embodiments where the hypervisor 202 executes the control program 220 within a virtual machine 232, that virtual machine 232 can be referred to as the control virtual machine 232. In still another embodiment, the control program 220 executes within a virtual machine 232 that is authorized to directly access physical resources on the computing device 201.

In some embodiments, a control program 220A (Not Shown) on a first computing device 201A (Not Shown) may exchange data with a control program 220B (Not Shown) on a second computing device 201B (Not Shown). In these embodiments the first computing device 201A may be located remote from the second computing device 201B. The control programs 220A-B can exchange data via a communication link between a hypervisor 202A (Not Shown) executing on the first computing device 201A and a hypervisor 202B (Not Shown) executing on the second computing device 201B. Through this communication link, the computing devices 201A-B can exchange data regarding processors and other physical resources available in a pool of resources. Further, through this connection between hypervisors 202A-B, the hypervisors 202A-B can manage a pool of resources, e.g. the resources available on the first computing device 201A and the second computing device 201B, distributed across one or more computing devices 201A-B. The hypervisors 202A-B can further virtualize these resources and make them available to virtual machines 232 executing on the computing devices 201A-B. In another instance of this embodiment, a single hypervisor 202 can manage and control virtual machines 232 executing on both computing devices 201A-B.

In some embodiments, the control program 220 interacts with one or more guest operating systems 230A-B (generally 230.) The control program 220 can communicate with the guest operating systems 230 through a hypervisor 202. Through the hypervisor 202, the guest operating system 230 can request access to physical disks 204, physical processors 208, memory 216, physical devices 206 and any other component in the hardware layer 210. In still other embodiments, the guest operating systems 230 can communicate with the control program 220 via a communication channel established by the hypervisor 202, such as, for example, via a plurality of shared memory pages made available by the hypervisor 202.

In some embodiments, the control program 220 includes a network back-end driver for communicating directly with networking hardware provided by the computing device 201. In one of these embodiments, the network back-end driver processes at least one virtual machine request from at least one guest operating system 230. In other embodiments, the control program 220 includes a block back-end driver for communicating with a storage element on the computing device 201. In one of these embodiments, the block back-end driver reads and writes data from the storage element based upon at least one request received from a guest operating system 230.

In another embodiment, the control program 220 includes a tools stack 224. In another embodiment, a tools stack 224 provides functionality for interacting with the hypervisor 202, communicating with other control programs 220 (for example, on a second computing device 201B), or managing virtual machines 232 on the computing device 201. In another embodiment, the tools stack 224 includes customized applications for providing improved management functionality to an administrator of a virtual machine farm. In some embodiments, at least one of the tools stack 224 and the control program 220 include a management API that provides an interface for remotely configuring and controlling virtual machines 232 running on a computing device 201. In other embodiments, the control program 220 communicates with the hypervisor 202 through the tools stack 224.

In one embodiment, the hypervisor 202 executes a guest operating system 230 within a virtual machine 232 created by the hypervisor 202. In another embodiment, the guest operating system 230 provides a user of the computing device 201 with access to resources within a computing environment. In still another embodiment, a resource includes a program, an application, a document, a file, a plurality of applications, a plurality of files, an executable program file, a desktop environment, a computing environment, or other resource made available to a user of the computing device 201. In yet another embodiment, the resource may be delivered to the computing device 201 via a plurality of access methods including, but not limited to, conventional installation directly on the computing device 201, delivery to the computing device 201 via a method for application streaming, delivery to the computing device 201 of output data generated by an execution of the resource on a second computing device 201' and communicated to the computing device 201 via a presentation layer protocol, delivery to the computing device 201 of output data generated by an execution of the resource via a virtual machine executing on a second computing device 201', or execution from a removable storage device connected to the computing device 201, such as a USB device, or via a virtual machine executing on the computing device 201 and generating output data. In some embodiments, the computing device 201 transmits output data generated by the execution of the resource to another computing device 201'.

In one embodiment, the guest operating system 230, in conjunction with the virtual machine on which it executes, forms a fully-virtualized virtual machine that is not aware that it is a virtual machine; such a machine may be referred to as a "Domain U HVM (Hardware Virtual Machine) virtual machine" In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 202. In such an embodiment, the driver is typically aware that it executes within a virtualized environment.

In another embodiment, the guest operating system 230, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control program 220, as described above.

Figure 2B:
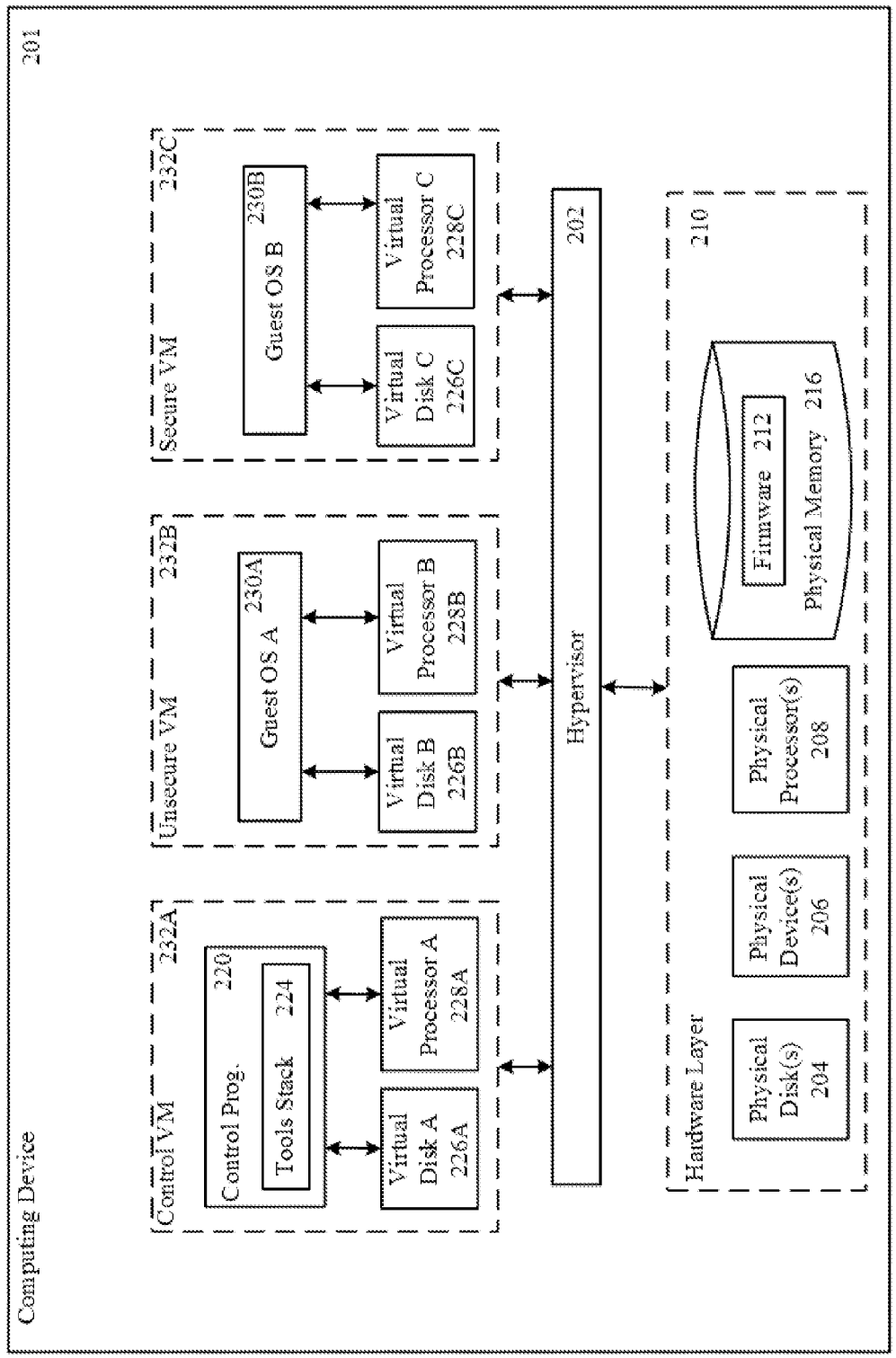

Illustrated in FIG. 2B is another embodiment of a virtualization environment that illustrates a Type 1 hypervisor 202. Executing on the computing device 201 is a hypervisor 202 that can directly access the hardware and resources within the hardware layer 210. Virtual machines 232 managed by the hypervisor 202 can be an unsecure virtual machine 232B and/or a secure virtual machine 232C. Whereas the virtualization environment depicted in FIG. 2A illustrates a host operating system 214, the virtualization environment embodiment in FIG. 2B does not execute a host operating system.

Further referring to FIG. 2B, and in more detail, the virtualization environment includes a Type 1 hypervisor 202. Type 1 hypervisors 202, in some embodiments, execute on "bare metal," such that the hypervisor 202 has direct access to all applications and processes executing on the computing device 201, all resources on the computing device 201 and all hardware on the computing device 201 or communicating with the computing device 201. While a Type 2 hypervisor 202 accesses system resources through a host operating system 214, a Type 1 hypervisor 202 can directly access all system resources. The Type 1 hypervisor 202 can execute directly on one or more physical processors of the computing device 201, and can include program data stored in the physical memory 216.

In a virtualization environment that employs a Type 1 hypervisor 202 configuration, the host operating system can be executed by one or more virtual machines 232. Thus, a user of the computing device 201 can designate one or more virtual machines 232 as the user's personal machine. This virtual machine can imitate the host operating system by allowing a user to interact with the computing device 201 in substantially the same manner that the user would interact with the computing device 201 via a host operating system 214.

Virtual machines 232 can be unsecure virtual machines 232B and secure virtual machine 232C. While FIG. 2B illustrates a secure and unsecure virtual machine, sometimes they can be referred to as privileged and unprivileged virtual machines. In some embodiments, a virtual machine's security can be determined based on a comparison of the virtual machine to other virtual machines executing within the same virtualization environment. For example, were a first virtual machine to have access to a pool of resources, and a second virtual machine not to have access to the same pool of resources; the second virtual machine could be considered an unsecure virtual machine 232B while the first virtual machine could be considered a secure virtual machine 232A. In some embodiments, a virtual machine's 323 ability to access one or more system resources can be configured using a configuration interface generated by either the control program 220 or the hypervisor 202. In other embodiments, the level of access afforded to a virtual machine 232 can be the result of a review of any of the following sets of criteria: the user accessing the virtual machine; one or more applications executing on the virtual machine; the virtual machine identifier; a risk level assigned to the virtual machine based on one or more factors; or any other similar criteria.

In some embodiments, unsecure virtual machines 232B may be prevented from accessing resources, hardware, memory locations, and programs that secure virtual machines 232A may access. For example, a secure virtual machine 232C may be able to access one or more company resources, while the unsecure virtual machine 232B cannot access any company resources.

Figure 3:
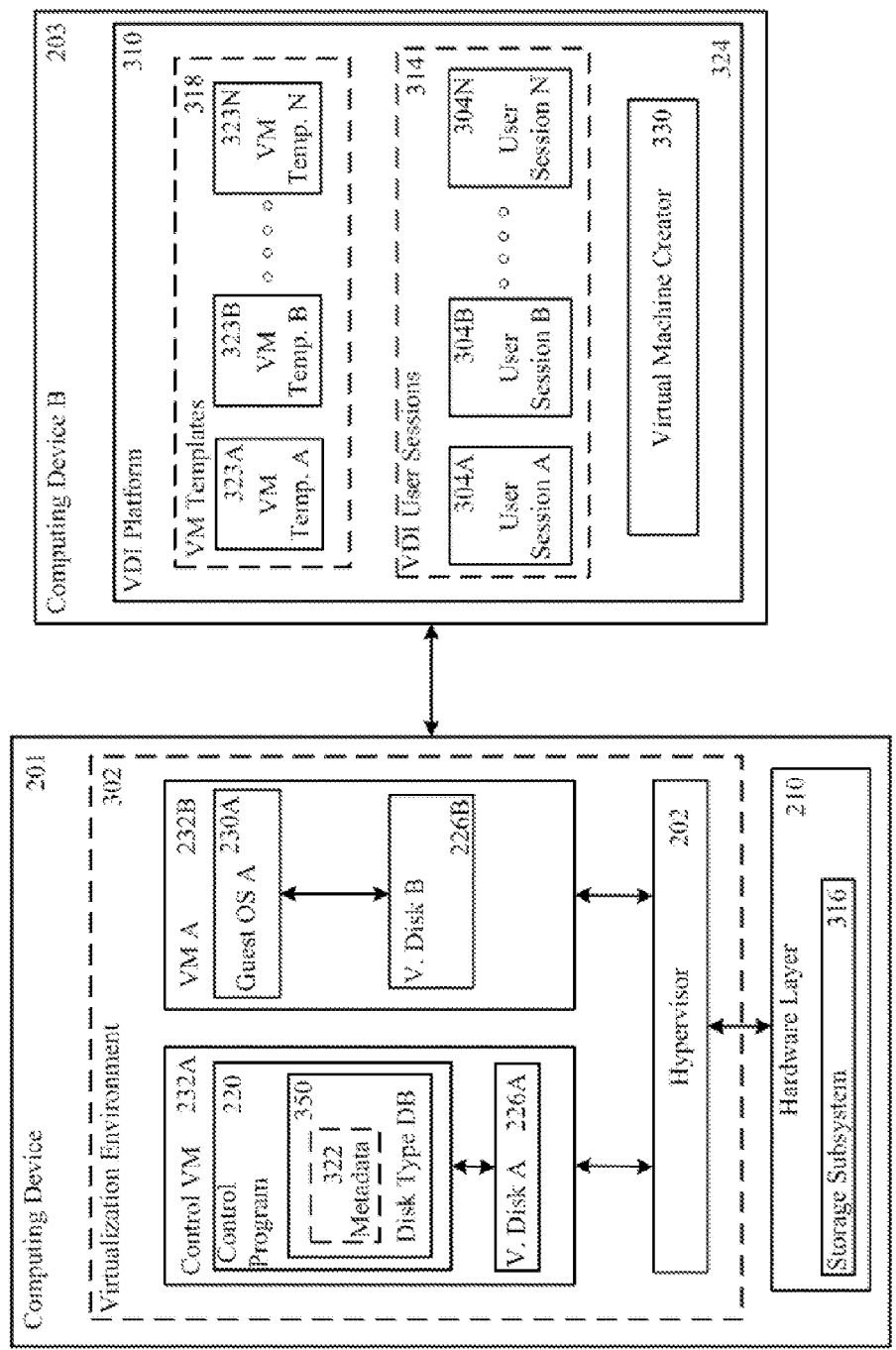
FIG. 3 is a block diagram that depicts embodiments of a virtualization environment and a virtual desktop infrastructure environment.

Illustrated in FIG. 3 is one embodiment of a system that includes a computing device 201 executing a virtualization environment 302 and a computing device 203 that executes a virtual desktop infrastructure (VDI) platform 310 and a performance monitoring system 316. The virtualization environment 302 executing on the computing device 201, can be any virtualization environment described herein. The illustrated embodiment depicts a virtualization environment 302 that includes a hypervisor 202, a control virtual machine 232A and one or more additional virtual machines 232B. The control virtual machine 232A can include a control program 220 communicating with a virtual disk 226A associated with metadata 322. The control program 220 can further include a disk type database 350 which can store the metadata 322 associated with the virtual disks 226 of the virtualization environment 302. The additional virtual machine(s) 232B can execute a guest operating system 230A that communicates with a virtual disk 226B associated with metadata 322. The computing device 201 can include a hardware layer 201 that interfaces with the hypervisor 202 and that includes a storage subsystem 316. The other computing device 203 can include a VDI platform 310 that can encompass a virtual machine template pool 318 of one or more virtual machine templates 323A-N (herein generally referred to as virtual machine template 323) and a group of VDI user sessions 314 that includes one or more user sessions 304A-N (herein generally referred to a user sessions 304.) The other computing device 203 can also execute a virtual machine creator 330.

Further referring to FIG. 3, and in more detail, in one embodiment each computing device 201, 203 can be any computing device 100 described herein. In some embodiments, the computing devices 201, 203 can be a server 106 or a client 102. The computing devices 201, 203 can be referred to a first computer, a second computer, a third computer, etc. Furthermore, the computing devices 201, 203 can communicate with one another over a network such as any network 104 described herein. In one embodiment one computing device 201 can be a remote computer 201, while the other computing device can be a local computer 203. As the computing devices 201, 203 can be any computing machine 100 described herein, so too the hardware layer 210 can be any hardware layer 210 described herein and can include any computer hardware described herein.

The virtualization environment 302 executing on the computing device 201, can be any virtualization environment described herein. In particular, the virtualization environment 302 can include any hypervisor configuration, or either the hypervisor configuration illustrated in FIG. 2A or the hypervisor configuration illustrated in FIG. 2B. In one embodiment, the hypervisor 202 included in the virtualization environment 302 can be any hypervisor 202, or any hypervisor 202 described herein.

FIG. 3 illustrates a computing machine 302 that includes a virtualization environment 302 which includes a control virtual machine 232, such as any control virtual machine 232 described herein. The control virtual machine 232 executes a control program 220, such as any control program 220 described herein, and can include a virtual disk 226, such as any virtual disk 226 described herein. While FIG. 3 illustrates a virtualization environment 302 that includes a control virtual machine 232A and another virtual machine 232B, in some embodiments the virtualization environment 302 can include any number of virtual machines 232. The virtual machines 232 can execute a guest operating system 230, such as any guest operating system 230 described herein, and can include a virtual disk 226, such as any virtual disk 226 described herein.

The hardware layer 210, in some embodiments, can include a storage subsystem 310. In one embodiment, the storage subsystem 316 can be a system that includes the physical hard disks of the computing device 201 and management programs for managing read/writes to those physical disks. In still other embodiments, the storage subsystem 316 can include any physical storage repository of the computing device including permanent memory storage, temporary memory storage, disk drives (e.g. optical, floppy, tape), hard disks, external hard drives, flash memory, network-attached storage, a storage-area network, or any other storage repository that the computing device 201 can access. When the storage subsystem 316 optimizes storage characteristics in light of a virtual disk 226 included in a virtual machine 232 can include determining an optimal way to read/write to physical disks of the computing machine 201 to service requests to access the virtual disk 226.

A storage subsystem 316, in some embodiments, can select a storage optimization to optimize management of the physical memory resources. In these embodiments, the virtualization environment 302 does not select the storage optimizations but rather passes disk type data and virtual disk 226 information to the storage subsystem 316 so that the subsystem 316 can select a storage optimization. The storage subsystem 316 can have access to different storage optimizations depending on the type of available storage and the disk type of a virtual disk 226. These optimizations can be made available through plugins or other modular applications. Using information about the virtual disk 226 disk type and the amount, type and restrictions on the physical storage of the computing device 201, the storage subsystem 316 can select an appropriate storage optimization.

In one embodiment, the virtual disk 226 included in each virtual machine 232 can further store, include or be associated with metadata 322. Metadata 322 can be stored in a disk type database 350 within the control program 220, or can be stored in any centralized storage repository on the computing device 201. For example, the metadata 322 can be stored in a storage repository within the control virtual machine 232, or within a storage repository accessible by the hypervisor 202, or any other similar storage mechanism. In some embodiments, the metadata 322 can be stored directly on the virtual disk(s) 226. The metadata 322 can be any form of metadata such as:

electronic information; electronic files; tags; images; documents; text files; tables; lists; or any other form of electronic data that includes information. The metadata 322 can include information related to the virtual disk 226 such as the disk type, the functionalities associated with the disk, compression schemes for the disk, or any other information related to the disk.

The metadata 322 can, in some embodiments, be stored in a disk type database 350 stored within the context of the control program 220. In other embodiments, the disk type database 350 can be stored within the control virtual machine 232A or within any centralized storage area that can be accessed by each of the virtual machines 232 within the virtualization environment 302 and the control program 220. The disk type database 350 can be any database, and in some embodiments can be any storage repository. The metadata 322 stored in the disk type database 350 can be any type of metadata 322 described herein, and can be metadata 322 associated with the virtual disks 226 of the virtualization environment 302. While FIG. 3 illustrates a virtualization environment 302 on a single physical machine 201, in other embodiments the database 350 that stores the metadata 322 can store the metadata 322 for virtual disks 226 within virtual machines 232 not executing on the same physical machine 201 as the disk type database 350. In other embodiments, the disk type database 350 can store metadata 322 for multiple virtual disks 226 in multiple virtualization environments 302, where the virtualization environments can execute on different and separate physical computers. In still other embodiments, the disk type database 350 can be located on a computer or storage device remotely located from the computing device 201.

In one embodiment, each virtual disk 226 can have a disk type. A disk type can be a characterization of the functions performed by the virtual disk 226. In some embodiments, the disk type can refer to a primary use of the virtual disk 226. Although the disk type can indicate a primary functionality or purpose, the virtual disk 226 may, in some embodiments, perform other functions that do not fall within the typical characteristics of a disk type assigned to the virtual disk 226. The following chart illustrates exemplary disk types and a typical storage optimization for that disk type. The chart is not dispositive of every possible disk type or storage optimization, but rather is descriptive of embodiments of disk types and accompanying storage optimizations.

CHART 1

Disk Type/Storage Optimization Embodiments

| Disk Type | Storage Optimization |
| --- | --- |
| Operating System (OS) Image | Create a local in-memory cache of a common parent in a snapshot chain |
| Non-Persistent Cache | Re-order writes |
| Non-Persistent Cache | Early write acknowledgements |
| Non-Persistent Cache | Use local storage |
| User-Data Disk | Conservative optimizations |

As illustrated above in Chart 1, in one embodiment a disk that has a disk type identifying the virtual disk 226 as an OS image can be optimized by determining that a local in-memory cache of a common parent should be created. In this embodiment, the selected optimization can be selected based on an assumption that many OS images are created from a "gold standard" image that contains a base suite of programs. Thus, there is a substantially high likelihood that other virtual machines executing in the same virtualization environment as the virtual machine that has this virtual disk, also contain an OS image created from substantially the same "gold standard" image. This characteristic of the OS image virtual disk 226 can lead to a determination that a way to optimize the storage subsystem can be to create an in-memory per-host cache of the disk's parent in snapshot chain. By optimizing the storage system 316 in this manner, the storage system 316 can now read from a single in-memory cache of the "gold standard" disk rather than have to read from each virtual machine disk 226 within the virtualization environment 302. Furthermore, by optimizing the storage subsystem 316, the system can be optimized such that virtual machine 232 boot time can be reduced since the control program 220 need only read from a single "gold standard" cache of the OS. Similarly, the number of input/output operations can be reduced because rather than each process, or application needing to read from the storage of each virtual machine 232, these processes and applications can read from the "gold standard" cache when the requested information relates to the OS image. Therefore in this embodiment, caching the virtual disk's parent image can lead to system optimizations such as a reduced boot time, a reduced number of input/output operations, a reduced number of read requests and a compartmentalization of the OS image storage into a single location within the virtualization environment 302.

Also illustrated in Chart 1 is an embodiment of a disk that has a disk type identifying the virtual disk 226 as a non-persistent cache. In one embodiment, there exist multiple ways to optimize a storage subsystem for a non-persistent cache virtual disk 226. Chart 1 describes three exemplary ways in which the storage subsystem 316 can be optimized. In one embodiment, the storage subsystem 316 can be permitted to re-order writes issued to a virtual disk 226. Typically storage subsystems 316 cannot re-order writes issued by an application to a virtual disk 226. This restriction results from the relationship between the storage subsystem 316, the operating system and applications executing within the context of the operating system, to commit writes to a disk in the order in which the writes are received. Enforcing this policy ensures system consistency. However, when a virtual machine boots after a crash, data stored on the disk 226 in the virtual machine 232 can be destroyed, thus it becomes safe to reorder writes to the disk 226. In some aspects, permitting the storage subsystem 316 or a disk scheduler executing within the storage subsystem 316 the ability to re-order writes can increase the storage subsystem's 316 ability to service a maximum number of input/output operations. By permitting the re-ordering of writes to the virtual disk 226 and thereby servicing a maximum number of input/output operations, the number of storage targets required for an action or process are reduced.

In another embodiment, the storage subsystem 316 can be permitted to issue early write acknowledgments when the disk type of the virtual disk 226 is non-persistent cache. Typically storage subsystems 316 do not acknowledge a write to a disk until the write has been committed. This characteristic of storage subsystems 316 permits applications, operating systems, and transaction processing systems to rely on this property of the storage subsystem 316 when there is a system crash or following a spontaneous shut-down event. Thus, typically a storage subsystem 316 may not acknowledge a write to a virtual disk 226 when the write is stored in a buffer cache. After a system crash, it may be advantageous to acknowledge writes when a write is stored in a buffer cache and before the write is committed to the virtual disk 226 because the faster a write acknowledgement is issued, the faster the acknowledgement can be transmitted back to the application or machine that issued the write. A faster response time can permit applications to execute faster because the applications spend less time waiting from acknowledgements from the storage subsystem 316. In still another embodiment, a non-persistent cache disk type can work in conjunction with an optimization that directs the storage subsystem 316 to use local storage. The data stored on a non-persistent cache disk often is low priority data that does not include user-critical or system-critical information, and that may be invalidated when a virtual machine boots. Thus, in many embodiments, a virtual machine 232 may not need a disk dedicated to non-persistent cache. In these embodiments, the virtualization environment 302 may configure the virtual machine 232 and the disk 226 so that a local storage within the virtual machine 232 or the environment 302 can be used as a non-persistent cache. By permitting local storage to function as non-persistent cache, the amount of expensive shared storage required to deploy the virtual machine 232 and its virtual disk 226 can be reduced, as can the load on the network.

Chart 1 also illustrates an exemplary pairing of a virtual disk 226 that has a disk type of user-data disk, and the storage subsystem 316 optimization of being conservative with the manner in which disk data is managed, modified, deleted and accessed. User data can often include sensitive information such as user documents and files, critical information, sensitive information that requires a great deal of security and/or encryption, or other similar pieces of information. Thus, the storage subsystem 316 can be optimized such that any actions taken with regard to the virtual disk 226 are consistent with the importance of the user-data. In some embodiments, this optimization can include disabling other optimizations such as "re-order writes," "early write acknowledgements," and user local storage.

In some embodiments, the control program 220 can establish a connection with the VDI platform 310 so that the control program 220 can receive virtual machine templates 323 and other information from the VDI platform 310. The connection, in some embodiments can be a communication link or a virtual channel over which the control program 220 and the VDI platform 310 can communicate. Data and information transmitted or streamed over the virtual channel can be encapsulated in a protocol such as any protocol described herein. In some embodiments, the information can be encapsulated in a presentation level protocol such as the ICA protocol developed by CITRIX SYSTEMS, INC. of Fort Lauderdale, Fla. The control program 220, in some embodiments, can stream or download virtual machine information from the VDI platform 310. While FIG. 3 illustrates a system where the control program 220 establishes a communicative connection with the VDI platform 310, in other embodiments another application such as a VDI client can establish the communicative connection. In these embodiments, the other application can execute within a control program 220, within a control virtual machine 232A or within the hypervisor 202.

When, in some embodiments, the control program 220 either streams or downloads a virtual machine template 323 from the VDI platform 310, the control program 220 can either execute a virtual machine using the virtual machine template 323 data, or the control program 220 can instantiate an instance of a virtual machine using the virtual machine template 323. In some instances, the virtual machine 232 generated from the virtual machine template 323 includes substantially the same information as the information included in the virtual machine template 323. Therefore the data, the virtual disk and any applications included in the virtual machine template 323 are included in the virtual machine 232.

In one embodiment, the remote computing device 203 can execute a VDI platform 310. The VDI platform 310 can be any platform able to implement and manage a virtual desktop infrastructure. In one embodiment, the VDI platform 310 can communicate with other applications or programs executing on the computing device 203, and in some embodiments can communicate with a performance monitoring system 316. In other embodiments, the VDI platform 310 can be any platform provided by the XEN DESKTOP family of products manufactured by CITRIX SYSTEMS, INC. of Fort Lauderdale, Fla. The VDI platform 310, in one embodiment, can be a platform that establishes user sessions between users and the VDI platform 310, and that allocates virtual machines 232, virtual desktops and other similar resources to the user sessions. The VDI platform 310 can also manage the virtual resources allocated to the user sessions and can further perform load balancing functions to load balance the virtual resources amongst the user sessions based on a variety of criteria.

The VDI platform 310, in some embodiments, can manage a pool or group of virtual machine templates (herein referred to generally as the virtual machine pool 318.) This pool or group of virtual machines can include one, two or multiple virtual machine templates 323. In some embodiments, the virtual machine templates 323 can be virtual machines. In other embodiments, the virtual machine templates 323 can be streamed or downloaded into a virtualization environment 302, and can be configured and executed to generate or instantiate a virtual machine 232. In other embodiments, the virtual machine templates 323 can be a collection of executable instructions, applications or other computing resources that, when streamed or downloaded into a virtualization environment 302, can be configured and executed to generate or instantiate a virtual machine 232.

Virtual machine templates 323, in some embodiments, can be configured to include a copy of metadata associated with the template when the virtual machine template 323 is cloned. Thus, in some embodiments, when a virtual machine template 323 is cloned or copied to create a copy of the virtual machine template 323, the metadata 322 of the virtual disk 226 is preserved. Therefore when a virtual machine template 323 is streamed or downloaded to a virtualization environment 302, the virtualization environment 302 preserves the metadata 322 of the virtual disk 226, and propagates the disk type stored in the metadata 322 to the virtual machine instance created from the virtual machine template 323.

In some embodiments, the VDI platform 310 can manage a pool or group of user sessions 314 (herein referred to generally as the user session pool 314.) This pool or group of user sessions 314 can include one or more user sessions 304 created between a user and the VDI platform 310. In some embodiments, a user session 304 can be generated when a user of a client computing device located remote from the computing device 203, requests a virtual desktop or a virtual machine, or requests access to a virtual desktop or a virtual machine. In other embodiments, a user session 304 can be created when a user logs onto a VDI platform 310 via a remote client computer. Still other embodiments include user sessions 304 that can be created when a user requests access to an application or resource available through a virtual machine or virtual desktop.

A user session 304, in some embodiments, can be a session between the computing device 203 and the user of a client machine, or a session between the VDI platform 310 and the user of a client machine. In each of these embodiments, the client machine can be a computer that is remotely located from the computing device 203, or the client machine can be the remote computer 201 executing the virtualization environment 302. In one embodiment, the user session 304 can be created by the VDI platform 310 in response to a user request to log onto the VDI platform 310, a user request to access an application or resource, or a user request for a virtual machine or a virtual desktop. Users can access aspects of the VDI platform 310 from within a user session 304. Similarly, users can interact with a virtual machine 232 assigned to a user, within the user session 304.

The computing device 203 can, in some embodiments, include a virtual machine creator 330 that can assemble virtual machines 232 from the virtual machine templates 318. In some instances, the virtual machine creator 330 can stream virtual machines from the computer 203 to the virtualization environment 302 after creating the virtual machine 232 from a virtual machine template 323. While FIG. 3 illustrates a computer that includes a virtual machine creator 330, in some embodiments, the computer 203 may not include a virtual machine creator 330. In these embodiments, the control virtual machine 232 can create or otherwise boot a virtual machine 232 from a received virtual machine template 323. The virtual machine creator 330, in some embodiments, can create the virtual machine templates 323 based on a user request, or can annotate or otherwise modify a virtual disk 226 in a virtual machine template 323 to include metadata describing the disk type of the virtual disk 226.

Figure 4A:
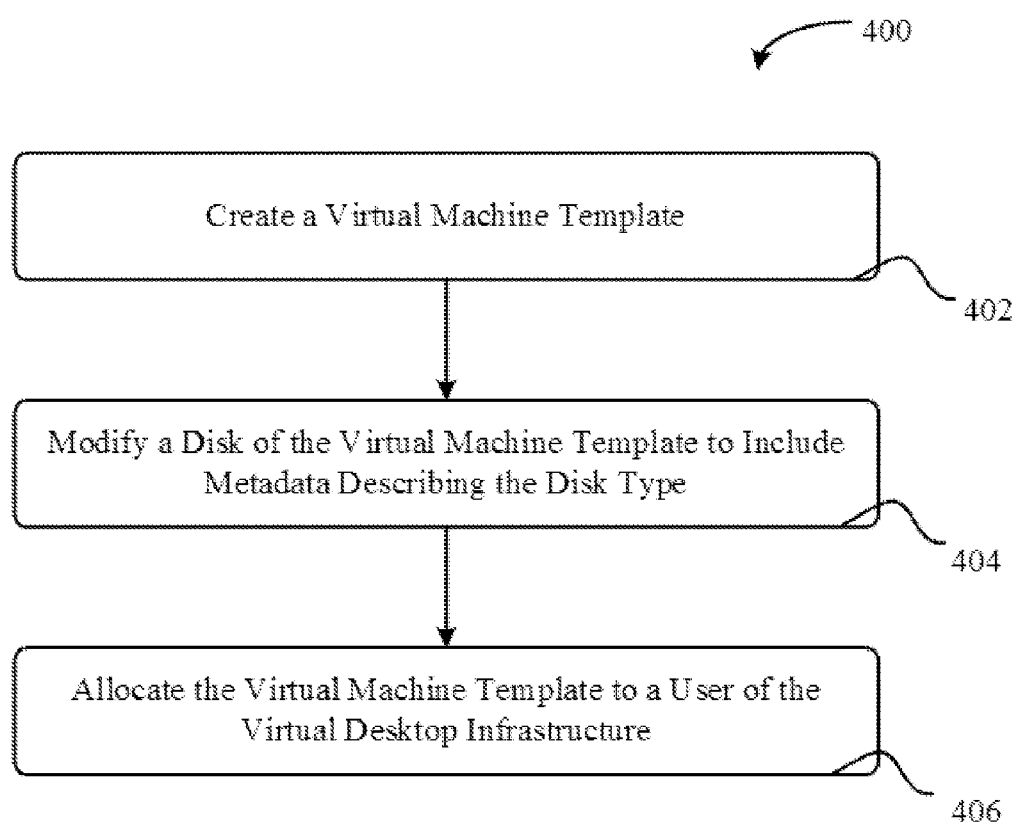
FIG. 4A is a flow diagram that depicts an embodiment of a method for modifying a virtual disk.

Illustrate in FIG. 4A is one embodiment of a method 400 for modifying a virtual disk 226 included within a virtual machine template 323. In this method a virtual machine template can be created (Step 402), a virtual disk 226 in the virtual machine template 323 can be modified to include metadata that describes the disk type (Step 404), and the virtual machine template 323 can be allocated to a user of the virtual desktop infrastructure 310 (Step 406).

Further referring to FIG. 4A, and in more detail, in one embodiment a virtual machine template 323 can be created (Step 402). In some embodiments the virtual desktop infrastructure 310 creates the virtual machine template 323, while in other embodiments a virtual machine creator 330 creates the virtual machine template 323. In still other embodiments, a sub-program or application executing within the virtual desktop infrastructure 310 can create the virtual machine template 323. The virtual machine template 323 can be created in response to a user's request for a virtual machine 232. User specifications can be used to determine what to include in the virtual machine template 323 (e.g. disk type of a virtual disk, type of OS, applications, etc.) In one embodiment, the virtual machine template 323 can be created in response to a user's request for access to one or more applications or resources.

The virtual desktop infrastructure 310, upon creating the virtual machine template, can modify a virtual disk 226 included in the virtual machine template 323 to include metadata that describes the disk type of the virtual disk 226 (Step 404). In some embodiments, modifying the virtual disk 226 can include extending the metadata 322 of the virtual disk 226 to include a field for recording the disk type of the virtual disk 226. In still other embodiments, modifying the virtual disk 226 can include annotating the virtual disk 226 to include metadata 322 that describes the disk type of the virtual disk 226. In yet another embodiment, modifying the virtual disk 226 can include generating metadata 322 that maps the virtual disk 226 to a specific virtual disk type, and storing that metadata 322 on the virtual disk 226. Given that a virtual disk 226 is not a physical disk, storing the metadata 322 on the virtual disk 226 can include storing the metadata 322 with the virtual disk 226 data and with instructions indicating that the metadata 322 should appear to be stored on a sector of the virtual disk 226.

In some embodiments, the metadata 322 can be stored in a repository adjunct to the virtual disk 226. When the VDI platform 310 transmits or streams the virtual machine template 323 to the control program 220, the VDI platform 310 can also transmit or stream the metadata 322 associated with each virtual disk 226 included in the virtual machine template 323. The control program 220, upon receiving the virtual machine template 323 and virtual disk metadata 322, can store the virtual disk metadata 322 in a database such as the disk type database 350 of the control program 220. In other embodiments, the control program 220 can store the virtual disk metadata 322 in any storage repository within the virtualization environment 302 that is accessible by the control program 220 and the storage subsystem 316. One embodiment can include a VDI platform 310 that stores the metadata 322 along with the virtual disk 226 in the virtual machine template 323. In this embodiment, the control program 220 can extract the virtual disk metadata 322 upon receiving the virtual machine template 323 from the VDI platform 310. Once the control program 220 extracts the virtual disk metadata 322, the control program 220 can insert the virtual disk metadata 322 into the disk type database 350. Inserting the virtual disk metadata 322 can include generating a record in the disk type database 350 that associates the virtual disk 226 with a disk type identified in the virtual disk metadata 322. The record can also include: the name of the virtual machine 232 that includes the virtual disk 226; a virtual machine 232 identifier; the name of the user session or user to which the virtual machine is allocated, and any similar information.

The virtual desktop infrastructure 310 can then allocate a virtual machine template to a user (Step 406). A virtual machine template 323 can be chosen based on any type of criteria, e.g. user performance metrics, virtual machine metrics, user requests, etc. While in some embodiments the virtual machine template is allocated based on user information, in other embodiments the virtual machine template 323 is randomly allocated to the user. In some embodiments, the method 400 does not include the step of allocating the virtual machine template to a user (Step 406) because the virtual machine template 323 is created specifically for that user.

Figure 4B:
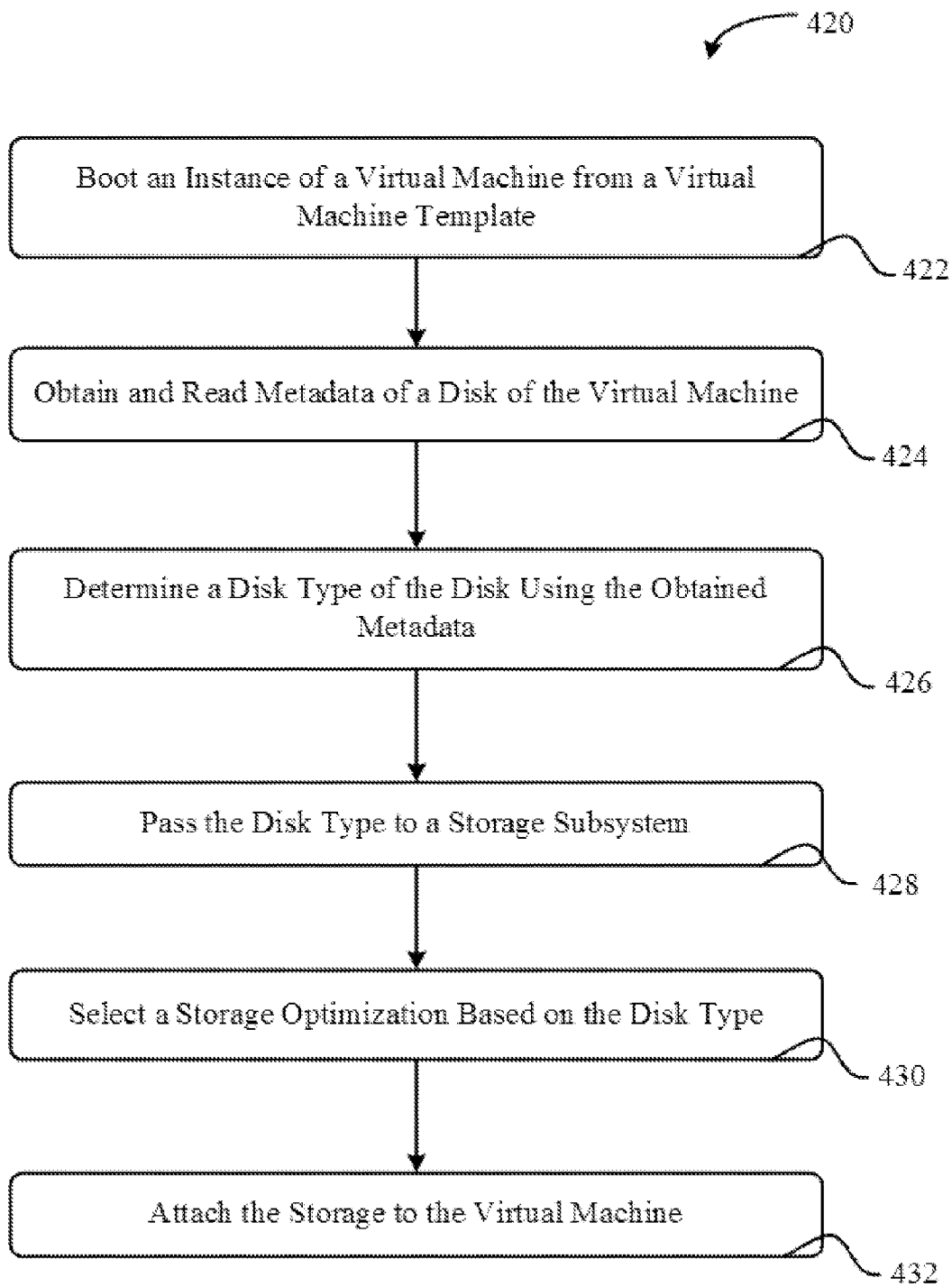
FIG. 4B is a flow diagram that depicts an embodiment of a method for selecting a storage optimization.

Illustrated in FIG. 4B is one embodiment of a method 420 for selecting a storage optimization. A virtualization environment 302 can boot an instance of a virtual machine 232 from a virtual machine template 323 (Step 422). Upon booting the instance of the virtual machine 232, the virtualization environment 302 can obtain and read metadata 322 of the virtual disk 226 included in the virtual machine 232 (Step 424) to determine the disk type of the virtual disk 226 (Step 426). The virtualization environment 302 can then pass the disk type information to the storage subsystem 316 (Step 428) which can then select a storage optimization based on the received disk type (Step 430). Upon selecting the storage optimization, the storage subsystem 316 can attach optimized storage to the virtual machine instance 232 (Step 432).

Further referring to FIG. 4B, and in more detail, in one embodiment the virtualization environment 302 boots an instance of a virtual machine 232 (Step 422). The virtual machine instance 232 can be created and can be based on a virtual machine template 323 transmitted to the virtualization environment 302 from the virtual desktop infrastructure 310. Thus, when a virtual desktop infrastructure 310 assigns a virtual machine template 323 to a user, the virtual desktop infrastructure 310 can then transmit the virtual machine template 323 to the virtualization environment 302. Upon receiving the virtual machine template 323, the virtualization environment 302 can boot a virtual machine 232 from the virtual machine template 323.

One a virtual machine 232 is booted from the virtual machine template 323, the virtualization environment 302 can obtain and read the metadata 322 of each virtual disk 226 included in the virtual machine 232 (Step 424). Obtaining the metadata 322 can include reading the metadata 322 from a storage location specified by the virtual disk 226. In other embodiments, reading the metadata 322 can include retrieving the metadata 322 from a virtual storage sector on the virtual disk 226, where the virtual storage section corresponds to a physical storage repository on the computing machine.

While FIG. 4B illustrates a method 420 where the metadata is obtained and read, in other embodiments the control program 220 does not obtain the metadata but rather queries the disk type database 350 for disk type information associated with the virtual machine 232. This query can include relevant information that can be used to look-up the disk type of one or more virtual disks 226 included in the booted virtual machine 232, such as: a virtual machine name or other identifier; a disk identifier; and a user or user session identifier.

Upon retrieving, obtaining or otherwise reading the metadata 322 for each virtual disk 226 of a virtual machine 232, the virtualization environment 302 can determine the disk type of the virtual disk 226 (Step 426) and pass the disk type to the storage subsystem 316 (Step 428). In some embodiments, the virtualization environment 302 can pass the disk type to the storage subsystem 316 via the hypervisor 202 and using an application program interface that interfaces with the storage subsystem 316 of the computer. In other embodiments, the virtualization environment 302 can pass the disk type to the storage subsystem 316 using fields in a simple messaging application programming interface.

The storage subsystem 316 can receive the disk type(s) from the virtualization environment 302, and can select a storage optimization using the disk type information (Step 430). In some embodiments, the storage subsystem 316 can select optimizations according to any of the combinations described herein. In other embodiments, the storage subsystem 316 can select a storage optimization according to those storage optimizations appropriate for a particular disk type.

While certain exemplary embodiments have been described and shown in the accompanying drawings, it is to be understood that such embodiments are merely illustrative of and not restrictive on the methods and systems described herein. Additionally, it is possible to implement the methods and systems described herein or some of its features in hardware, programmable devices, firmware, software or a combination thereof. The methods and systems described herein or parts of the methods and systems described herein may also be embodied in a processor-readable storage medium or machine-readable medium such as a magnetic (e.g., hard drive, floppy drive), optical (e.g., compact disk, digital versatile disk, etc), or semiconductor storage medium (volatile and non-volatile).

What is claimed is:

1. A method for modifying a virtual disk within a virtualization environment, the method comprising:
    creating, by a virtual desktop infrastructure executing on a computing machine, a virtual machine template comprising at least one virtual disk;
    modifying, by the virtual desktop infrastructure, the at least one virtual disk to comprise metadata describing a disk type of the at least one virtual disk, the at least one virtual disk specifying a storage location for the metadata, the metadata including a field for recording the disk type, the disk type being a characterization of the functions performed by the virtual disk;
    selecting, by the virtual desktop infrastructure, the virtual machine template for a user using at least one of user performance metrics, virtual machine metrics, and a user request;
    allocating, by the virtual desktop infrastructure, the virtual machine template to the user;
    receiving, by a storage subsystem executing on the computing machine, the metadata for the at least one virtual disk from the storage location; and
    selecting, by the storage subsystem, a storage optimization for the at least one virtual disk using the disk type.

2. The method of claim 1, further comprising copying the virtual machine template to create a second virtual machine template comprising the at least one virtual disk comprising the metadata describing the disk type.

3. The method of claim 1, wherein modifying the virtual disk to comprise metadata describing the disk type further comprises modifying the virtual disk to comprise metadata describing an operating system image disk type.

4. The method of claim 1, wherein modifying the virtual disk to comprise metadata describing the disk type further comprises modifying the virtual disk to comprise metadata describing a non-persistent cache disk type.

5. The method of claim 1, wherein modifying the virtual disk to comprise metadata describing the disk type further comprises modifying the virtual disk to include metadata describing an image customization disk type.

6. The method of claim 1, further comprising attaching, by the storage subsystem, optimized storage to an instance of a virtual machine using the selected storage optimization.

7. The method of claim 1, wherein the storage optimization comprises at least one of creating a local in-memory cache of a common parent in a snapshot chain, re-ordering writes to the virtual disk, acknowledging writes before committing to the virtual disk, using local storage, and disabling other storage optimizations.

8. The method of claim 7, wherein the disk type comprises at least one of an operating system image disk type, a non-persistent cache disk type, and an image customization disk type.

9. The method of claim 7, wherein the storage optimization comprises at least one of creating a local in-memory cache of a common parent in a snapshot chain, re-ordering writes to the virtual disk, acknowledging writes before committing to the virtual disk, using local storage, and disabling other storage optimizations.

10. A system for modifying a virtual disk within a virtualization environment, the system comprising:
    a virtual desktop infrastructure executing on a computing machine to:
        create a virtual machine template comprising at least one virtual disk,
        modify, responsive to creating the virtual machine template, the at least one virtual disk to comprise metadata describing a disk type of the at least one virtual disk, the at least one virtual disk specifying a storage location for the metadata, wherein the metadata is extended to include a field for recording the disk type, the disk type being a characterization of the functions performed by the virtual disk, the disk type identifying a storage location for the at least one virtual disk;

select the virtual machine template for a user using at least one of user performance metrics, virtual machine metrics, and a user request;
allocate the virtual machine template to the user; and
a storage subsystem executing on the computing machine to:
receive the metadata for the at least one virtual disk from the storage location; and
select a storage optimization for the at least one virtual disk using the disk type.

11. The system of claim 10, wherein the virtual desktop infrastructure copies the virtual machine template to create a second virtual machine template comprising the at least one virtual disk comprising the metadata describing the disk type.

12. The system of claim 10, wherein the metadata describes an operating system image disk type.

13. The system of claim 10, wherein the metadata describes a non-persistent cache disk type.

14. The system of claim 10, wherein the metadata describes an image customization disk type.

15. The system of claim 10, wherein the storage subsystem attaches optimized storage optimized to an instance of a virtual machine using the selected storage optimization.

16. The system of claim 10, wherein the storage optimization comprises at least one of creating a local in-memory cache of a common parent in a snapshot chain, re-ordering writes to the virtual disk, acknowledging writes before committing to the virtual disk, using local storage, and disabling other storage optimizations.

17. A method for selecting a storage optimization for a virtual disk within a virtualization environment, the method comprising:
booting, by a virtual desktop infrastructure executing on a computing machine, an instance of a virtual machine utilizing a virtual machine template comprising at least one virtual disk;
obtaining, by the virtual desktop infrastructure, metadata of the at least one virtual disk, the metadata describing a disk type, the disk type being a characterization of the functions performed by the virtual disk;
determining, by the virtual desktop infrastructure, the disk type using the metadata;
providing, by the virtual desktop infrastructure to a storage subsystem executing on the computing machine, the disk type for the at least one virtual disk;
selecting, by the storage subsystem, a storage optimization for the at least one virtual disk using the disk type; and
attaching, by the storage subsystem, optimized storage to the instance of the virtual machine using the selected storage optimization.

* * * * *